United States Patent
Rokowski et al.

(10) Patent No.: US 8,993,667 B2
(45) Date of Patent: Mar. 31, 2015

(54) REDOX POLYMERS FOR IMPROVED DIRT AND WATER RESISTANCE FOR ELASTOMERIC WALL AND ROOF COATINGS

(71) Applicant: Rohm and Haas Company, Philadelphia, PA (US)

(72) Inventors: Joseph M. Rokowski, Barto, PA (US); Mark D. Westmeyer, Collegeville, PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 14/208,537

(22) Filed: Mar. 13, 2014

(65) Prior Publication Data

US 2014/0275388 A1 Sep. 18, 2014

Related U.S. Application Data

(60) Provisional application No. 61/793,869, filed on Mar. 15, 2013.

(51) Int. Cl.
| | | |
|---|---|---|
| C09D 133/02 | (2006.01) | |
| C09D 133/04 | (2006.01) | |
| C09D 133/12 | (2006.01) | |
| C08K 3/24 | (2006.01) | |

(52) U.S. Cl.
CPC ............... *C09D 133/12* (2013.01); *C08K 3/24* (2013.01); *C09D 133/02* (2013.01); *C08L 2201/54* (2013.01)
USPC ............ 524/432; 524/556; 428/147; 428/148

(58) Field of Classification Search
USPC .................................. 524/432, 556
See application file for complete search history.

(56) References Cited

U.S. PATENT DOCUMENTS

| | | | |
|---|---|---|---|
| 2,976,203 A | 3/1961 | Young et al. | |
| 4,184,373 A | 1/1980 | Evans et al. | |
| 4,879,364 A | 11/1989 | Stanislawczyk | |
| 5,521,266 A | 5/1996 | Lau | |
| 6,060,532 A | 5/2000 | Frankel et al. | |
| 6,488,983 B2 | 12/2002 | Slone | |
| 6,528,581 B1 | 3/2003 | Kelly et al. | |
| 6,596,804 B1 | 7/2003 | Edwards et al. | |
| 6,605,318 B2 * | 8/2003 | Slone et al. | 427/208.4 |
| 6,930,141 B2 * | 8/2005 | Gebhart et al. | 524/515 |
| 7,241,834 B2 | 7/2007 | Even | |
| 7,931,972 B2 | 4/2011 | Hsu et al. | |
| 2002/0103283 A1 * | 8/2002 | Elfring et al. | 524/425 |
| 2010/0330286 A1 | 12/2010 | Wu et al. | |

FOREIGN PATENT DOCUMENTS

| | | |
|---|---|---|
| CA | 2346993 A1 | 4/2000 |
| EP | 1036835 A2 | 9/2000 |
| EP | 1078938 A1 | 2/2001 |
| EP | 2281856 A1 | 2/2011 |
| GB | 1259459 A | 1/1972 |
| JP | 2000309743 A | 11/2000 |
| WO | 2012109130 A1 | 8/2012 |

* cited by examiner

*Primary Examiner* — Vu A Nguyen
(74) *Attorney, Agent, or Firm* — Andrew E. C. Merriam

(57) ABSTRACT

The present invention provides elastomeric roof coatings and aqueous coating compositions of (i) an acrylic emulsion copolymer that comprises (ii) a reductant and has a high molecular weight, (iii) a combination of a hydrophilic polymeric dispersant and a pigment, extender or filler, and (iv) a multivalent transition metal ion or multivalent transition metal ion compound or salt. The composition and coating provide excellent swelling resistance and a balance of tensile and elongation in an acrylic roof coating composition.

10 Claims, No Drawings

REDOX POLYMERS FOR IMPROVED DIRT AND WATER RESISTANCE FOR ELASTOMERIC WALL AND ROOF COATINGS

The present invention relates to elastomeric roof coating compositions, e.g. white roof coating compositions, of elastomeric carboxyl group containing acrylic emulsion copolymers having an improved balance of tensile strength and percent elongation, as well as coatings and coated substrates made from the compositions. More particularly, it relates to pigmented aqueous elastomeric coating compositions comprising emulsion copolymers having a glass transition temperature (Tg) of from −45° C. to −10° C. which emulsion copolymer is the copolymerization product of a monomer mixture of (a) from 74 wt. % to 97.75 wt. %, of one or more $C_4$ to $C_6$ alkyl(meth)acrylates, such as butyl acrylate (BA), (b) from 2 to 20 wt. % of a hard vinyl monomer, such as a $C_1$ to $C_4$ alkyl(meth)acrylate, preferably, methyl methacrylate (MMA) or (meth)acrylonitrile (AN), (c) from 0.25 wt. % to 3.0 wt. % or, preferably, from 0.4 to 2.0 wt. %, of an acid monomer chosen from an ethylenically unsaturated acid functional monomer, preferably acrylic or methacrylic acid, or, more preferably, methacrylic acid, and a sulfonic acid or sulfonate ester monomer, a reductant, and a combination of one or more of a pigment, extender, filler and mixtures thereof with one or more hydrophilic dispersant, all monomer wt. % s based on the total solids in the monomer mixture.

Aqueous acrylic elastomeric roof coatings rarely have a balance of tensile and elongation properties for optimum performance. Synthetic approaches to achieving roof coatings with these properties have involved modifying the compositions used to make the coatings such as, for example, polymer composition, polymer molecular weight, emulsion processing etc, which can cause other performance problems and lead to high cost coating compositions. For roof coatings, emulsion polymerization has been run using a gradual addition feed with thermal initiators at high temperatures, thereby allowing a fast monomer feed rate and economical processes.

In addition, known acrylic emulsion copolymer elastomeric roof coatings do not have the long term water resistance of two-pack or solvent based roof coatings. Conventional acrylic elastomeric roof coating polymers made with acrylic or methacrylic acid often use zinc oxide in the pigmented formulation to improve performance properties such as water resistance and tensile strength; such improvements occur because zinc oxide interacts with the polymerized acids and ammonia in the formulation to provide divalent ion crosslinking. However, zinc oxide remains an expensive additive and zinc has been the subject of increasingly stringent regulation in recent years.

U.S. Pat. No. 6,605,318 B2 to Even et al. discloses a possible solution to the problem of reduced toughness in caulks, sealants, elastomeric coatings and adhesives, wherein methods of making the binder comprise redox polymerizing in the presence of from 0.0005 to 0.05 moles chain transfer agent per kg dry polymer weight, a mixture of from 0.3 to 10 wt. %, based on the weight of dry polymer, of a monoethylenically unsaturated acid monomer, and the remainder of one or more monoethylenically unsaturated nonionic (meth)acrylic monomer in a copolymer having a glass transition temperature of from −90° C. to −20° C. The copolymer includes as possible comonomers acrylic esters, aromatics, like styrene, and acrylonitrile (AN). However, the disclosed compositions have not solved the problem of providing acrylic roof coatings having acceptable water swelling resistance and dirt pick-up resistance. Moreover, the specific elastomeric coating compositions disclosed in Even et al. contain hydrophobic acid copolymer dispersants which can impair adhesion to roofing substrates.

Accordingly, the present inventors have endeavored to solve the problem of providing elastomeric roof coatings and aqueous coating compositions for use on roof coating substrates which enable the provision of acceptable water swelling resistance and dirt pick-up resistance while retaining an acceptable balance of tensile strength and elongation percentage in the coatings made from them.

1. In accordance with the present invention, aqueous compositions for coating roofing substrates comprise (i) one or more emulsion copolymer having a glass transition temperature (Tg) of from −45° C. to −10° C., or, preferably, from −35° C. to −10° C. having a weight average molecular weight of from 100,000 to 2,000,000 or, preferably, from 250,000 to 1,000,000, the emulsion copolymer being the copolymerization product of a monomer mixture of (a) from 74 wt. % to 97.75 wt. %, preferably, 80 wt. % or more, of one or more $C_4$ to $C_6$ alkyl(meth)acrylates, such as butyl acrylate (BA) or a mixture thereof with up to 20 wt. % of a $C_7$ to $C_{24}$ alkyl(meth) acrylate to make a total of 80 wt. % or more, or, preferably, 85 wt. % to 97.75 wt. %, (b) from 2 to 20 wt. % or, preferably, 15 wt. % or less of a hard vinyl monomer, such as a $C_1$ to $C_3$ alkyl(meth)acrylate or (meth)acrylonitrile, preferably, methyl methacrylate (MMA) or acrylonitrile (AN), and (c) from 0.25 wt. % to 3.0 wt. % or, preferably, from 0.4 to 2.0 wt. %, of one or more ethylenically unsaturated monofunctional carboxylic acid group containing monomer, preferably acrylic or methacrylic acid, or, more preferably, methacrylic acid, (ii) a reductant, and (iii) and a combination of one or more of a pigment, e.g. an opacifier, extender, filler and mixtures thereof with one or more hydrophilic polymeric dispersant in a total amount so that the composition has a pigment volume concentration (% PVC) of from 20 to 55 or, preferably, from 30 to 50, or, more preferably, 35 to 45, wherein the monomer mixture comprises 19.5 wt. % or less or, preferably, 10 wt. % or less, or, more preferably, 5 wt. % or less of any vinyl aromatic monomer, such as styrene; and further wherein, the monomer mixture comprises 11 wt. % or less or, preferably, 8 wt. % or less of (meth)acrylonitrile, all monomer wt. % s based on the total solids in the monomer mixture.

2. Preferably, the aqueous emulsion copolymer in the composition of 1, above, is a single stage polymer.

3. Preferably, the aqueous emulsion copolymer in the composition of 1 or 2, above, further comprises the copolymerization product of a monomer mixture having monomer c)2) from 0.1 to 1 wt. %, preferably, from 0.03 to 0.8 wt % of a sulfur acid monomer, such as sodium styrene sulfonate (SSS), acrylamidomethyl propane sulfonate (AMPS) or a polymerizable sulfur acid containing surfactant, based on the total solids in the monomer mixture.

4. Preferably, the aqueous emulsion copolymer composition of 1, 2 or 3, above, further comprises the copolymerization product of a monomer mixture having monomer d) from 0.1 to 2 wt. %, based on the total solids in the monomer mixture, of an adhesion promoting ethylenically unsaturated monomer, such as a ureido functional (meth)acrylate.

5. Preferably, in accordance with 1, 2, 3, or 4, above, the compositions further comprise (iv) one or more multivalent transition metal ion or multivalent transition metal ion compound or salt, such as zinc oxide or zinc hydroxide. Suitable multivalent transition metal ions, metal ion compounds or salts are any that when used in a molar ratio of multivalent metal or multivalent metal ion to carboxylic acid in the emulsion copolymer ranging, for example, from 0.02:1 to 1:1 or, preferably, from 0.08:1 to 0.7:1 do not alter the color of coatings made from compositions containing them but may contribute to opacity.

6. In another aspect of the present invention, an elastomeric pigmented roof coating comprises (i) one or more emulsion copolymer having a glass transition temperature (Tg) of from −45° C. to −10° C., or, preferably, from −35° C. to −10° C. having a weight average molecular weight of from 100,000 to 2,000,000, or, preferably, from 250,000 to 1,000,000, the emulsion copolymer having a reductant residue and being the copolymerization product of a monomer mixture of (a) from 74 wt. % to 97.75 wt. %, preferably, 80 wt. % or more, of one or more $C_4$ to $C_6$ alkyl(meth)acrylates, such as butyl acrylate (BA), or a mixture thereof with up to 20 wt. % of a $C_7$ to $C_{24}$ alkyl(meth)acrylate to make a total of 80 wt. % or more, or, preferably, 85 wt. % or more, (b) from 2 to 20 wt. % or, preferably, 15 wt. % or less a hard vinyl monomer, such as a $C_1$ to $C_3$ alkyl(meth)acrylate or (meth)acrylonitrile, preferably, methyl methacrylate (MMA) or acrylonitrile (AN), and (c) from 0.25 wt. % to 3.0 wt. % or, preferably, from 0.4 to 2.0 wt. %, of one or more ethylenically unsaturated carboxylic acid group containing monomer, preferably acrylic or methacrylic acid, or, more preferably, methacrylic acid, and from (c)(2) from 0 to 1 wt. %, or, preferably, from 0.03 to 0.8 wt % of a sulfur acid monomer, such as sodium styrene sulfonate (SSS), acrylamidomethyl propane sulfonate (AMPS) or a polymerizable sulfur acid containing surfactant, and wherein the monomer mixture comprises 19.5 wt. % or less or, preferably, 10 wt. % or less, or, more preferably, 5 wt. % or less of any vinyl aromatic monomer, such as styrene; and further wherein, the monomer mixture comprises 11 wt. % or less or, preferably, 8 wt. % or less of (meth)acrylonitrile, all monomer wt. % s based on the total solids in the monomer mixture, (ii) a reductant, (iii) a combination of one or more of a pigment, e.g. an opacifier, extender, filler and mixtures thereof with one or more hydrophilic polymeric dispersant in a total amount so that the composition has a pigment volume concentration (% PVC) of from 20 to 55 or, preferably, from 30 to 50, or, more preferably, 35 to 45, and (iv) one or more multivalent transition metal ion or multivalent transition metal ion compound or salt, such as zinc oxide or zinc hydroxide. Suitable multivalent transition metal ions, metal ion compounds or salts are any that when used in a molar ratio of multivalent metal or multivalent metal ion to carboxylic acid in the emulsion copolymer ranging, for example, from 0.02:1 to 1:1 or, preferably, from 0.08:1 to 0.7:1 do not alter the color of coatings made from compositions containing them but may contribute to opacity.

7. Preferably, the coating in item 6, above, comprises (i) one or more emulsion copolymer which further comprises the copolymerization product of a monomer mixture having monomer d) from 0.1 to 2 wt. %, based on the total solids in the monomer mixture, of an adhesion promoting ethylenically unsaturated monomer, such as a ureido functional (meth)acrylate.

8. Preferably, the coating in any one of items 6 or 7, above, comprises an elastomeric white roof coating.

9. Further, the present invention comprises coated roofing substrates having the coatings of any of items 6, 7 or 8, above, wherein the roofing substrates comprise asphaltic coatings, roofing felts, synthetic polymer membranes; modified bitumen membranes; foamed polyurethane, such as, spray polyurethane foam; metals, such as aluminum; previously painted, primed, undercoated, worn, or weathered substrates, such as metal roofs, weathered thermoplastic polyolefin (TPO), weathered poly(vinyl chloride) (PVC), weathered silicone rubber and weathered EPDM rubber. Less preferred roofing substrates may include cementitious substrates and previously painted cementitious substrates.

10. In the pigmented coatings of any of items 6, 7, 8 or 9, above, the (ii) pigment, extender, filler and mixtures thereof preferably comprises one or more extenders, such as calcium carbonate, and one or more pigments, such as titanium dioxide, iron oxide, opacifiers, fillers, color pigments and IR reflective pigments and mixtures thereof.

11. In another aspect, the present invention provides methods of making aqueous coating compositions of any of items 1, 2, 3, 4 or 5, above, comprising redox initiation emulsion polymerizing in an aqueous medium the monomer mixture of monomers (a), (b), (c), and, if included, monomers (c)(2) and (d) in the presence of an excess of (ii) reductant to form (i) a copolymer, combining the copolymer (i) and excess reductant with (iii) a combination of one or more of a pigment, e.g. an opacifier, extender, filler and mixtures thereof with one or more hydrophilic polymeric dispersant in a total amount so that the composition has a pigment volume concentration (% PVC) of from 20 to 55 or, preferably, from 30 to 50, or, more preferably, 35 to 45, and (iv) one or more multivalent transition metal ion or multivalent transition metal ion compound or salt, such as zinc oxide or zinc hydroxide.

12. In yet another aspect, the present invention provides methods of making coatings comprising applying the coating compositions of the present invention to a substrate, such as a weathered roofing substrate, followed by drying, e.g. at ambient temperature and humidity or at elevated temperature and ambient humidity. Drying can comprise, for example, ambient drying.

All ranges recited are inclusive and combinable. For example, a disclosed proportion of 0.3 wt. % or more of hydrolysable silane, or up to 2.0 wt. %, preferably 0.5 wt. % or more, or, preferably 1.5 wt. % or less, or more preferably, 0.7 wt. % or more, based on the total weight of emulsion copolymer solids would include proportions of from 0.3 to 2.0 wt. %, or of from 0.3 to 1.5 wt. %, or of from 0.3 to 0.7 wt. %, or of from 0.3 to 0.5 wt. %, or of from 0.5 to 2.0 wt. %, or of from 0.5 to 1.5 wt. %, or of from 0.5 to 0.7 wt. %, or of from 0.7 to 2.0 wt. %, or of from 0.7 to 1.5 wt. %, or of from 1.5 to 2.0 wt. %.

Unless otherwise indicated, all temperature and pressure units are room temperature and standard pressure.

All phrases comprising parentheses denote either or both of the included parenthetical matter and its absence. For example, the phrase "(meth)acrylate" includes, in the alternative, acrylate and methacrylate.

As used herein, the term "ASTM" refers to publications of ASTM International, Conshohocken, Pa.

Unless otherwise indicated, as used herein, the term "glass transition temperature" or "Tg" refers to the mid-point glass transition temperature of a polymer as determined by differential scanning calorimetry, in accordance with ASTM E-1356 (1991), with a ramp rate of 20° C./minute.

As used herein, unless otherwise indicated, the term "calculated Tg" or "calculated glass transition temperature" refers to the Tg of a polymer calculated by using the Fox equation (T. G. Fox, *Bull. Am. Physics Soc.*, Volume 1, Issue No. 3, page 123 (1956). For reference and use in calculating a Tg, a comprehensive compilation of available data describing glass transition temperatures of homopolymers from suitable monomers can be found in *Polymer Handbook*, Vol. 1, editors Brandrup, J.; Immergut, E. H.; Grulke, E. A., 1999, pages VI/193-277.

As used herein, the term "(meth)acrylate" means acrylate, methacrylate, and mixtures thereof and the term "(meth) acrylic" used herein means acrylic, methacrylic, and mixtures thereof.

As used herein, the term "pigment volume concentration" or % PVC refers to the quantity calculated by the following formula:

PVC(%)=(volume of pigment(s)+volume extender(s)+ volume of filler(s))/Total dry volume of coating× 100

As used herein, the term "polymer" refers, in the alternative, to a polymer made from one or more different monomer, such as a copolymer, a terpolymer, a tetrapolymer, a pentapolymer etc., and may be any of a random, block, graft, sequential or gradient polymer.

As used herein, the term "hard vinyl monomer" means any monomer which would if polymerized to yield a homopolymer having a weight average molecular weight of 50,000 or greater form such a homopolymer with a glass transition temperature of 10° C. or more, or, preferably, 25° C. or more. Examples include (meth)acrylonitrile, methyl methacrylate, ethyl methacrylate, isopropyl methacrylate, and styrene.

As used herein, the term "soft monomer" refers to any $C_4$ to $C_{24}$ alkyl(meth)acrylate monomer which would if polymerized to yield a homopolymer having a weight average molecular weight of 50,000 or greater form such a homopolymer with a glass transition temperature of −20° C. or less, or, preferably, −30° C. or less. Examples include almost any $C_4$ to $C_{24}$ alkyl(meth)acrylate except t-butyl acrylate, n-hexadecyl acrylate and neopentyl acrylate, isobornyl acrylate, butyl methacrylate, and isobutyl methacrylate. For reference, a comprehensive compilation of available data describing glass transition temperatures of homopolymers can be found in Polymer Handbook, Vol. 1, editors Brandrup, J.; Immergut, E. H.; Grulke, E. A., 1999, pages VI/193-277.

As used herein, the term "total emulsion copolymer solids" refers to the copolymerized monomers, chain transfer agents, and surfactants in a given emulsion copolymer composition.

As used herein, the term "total solids in the monomer mixture" refers to monomers as well as to reactive materials, such as chain transfer agents.

As used herein, the term "total composition solids" refers to everything in the composition other than water and volatile solvents.

As used herein, the term "substantially zinc free" or "substantially multivalent transition metal ion free" refers to a composition containing less than 750 ppm, or, preferably, less than 500 ppm of zinc, whether in elemental form, i.e. as a metal, as an ion or as that portion of a compound that is itself zinc, such as the zinc in zinc oxide or its salt.

As used herein, unless otherwise indicated, the term "average particle size" means a weight average particle size as determined by light scattering (LS) using a BI-90 particle size analyzer (Brookhaven Instruments Corp. Holtsville, N.Y.).

As used herein, the term "weight average molecular weight" or "MW" refers to the weight average molecular weight as measured by aqueous gel permeation chromatography (GPC) against a polyacrylic acid (PAA) standard of a copolymer that is hydrolyzed in KOH.

As used herein, the phrase "wt. %" stands for weight percent.

The present inventors have surprisingly discovered that a redox initiation polymerized emulsion copolymer made from a $C_4$ to $C_6$ alkyl(meth)acrylate or its combination with another soft monomer, a small amount of an ethylenically unsaturated carboxylic acid group containing monomer and a minor amount of a hard comonomer has all of improved water swelling resistance, tear resistance, mechanical properties and adhesion over its corresponding thermal initiated copolymer analog. While not being bound by theory, a redox initiated emulsion copolymerization enables lower polymerization temperatures and may, when compared to a thermal initiated emulsion copolymerization, alter a polymer architecture favorably to provide greater polymer backbone linearity with less side chain branching. It has been shown that in-process crosslinking of butyl acrylate can occur with typical thermal initiators like t-BHP. Further, previous $^1$HNMR work with redox emulsion polymers at high Tg have shown that redox emulsion copolymer surfaces may be more hydrophobic than identical compositions made by a thermal process. Linear polymers can improve performance properties through higher elongation and improved film formation while still providing good elongation. Thus, a higher proportion of adhesion promoter, e.g. ureido, groups are attached to polymer chain end groups and those end groups may more easily reach a substrate interface to improve adhesion.

The emulsion copolymer of the present invention comprises the emulsion copolymerization product of a monomer mixture under redox polymerization conditions.

As is known in the art, a monomer mixture is selected to give a desired Tg. The monomer components of the emulsion copolymer should be selected such that the Tg of the dried copolymer is from −45° C. to 0° C., and, preferably, from −30° C. to −10° C. Polymers having Tg's above 0° C. yield coatings which may lose their flexibility at low temperature. Polymers having Tg's of −50° C. or below are prone to tack issues, low tensile strength, and bleed-through of colored chemicals from substrate into coatings thereon, thereby deteriorate the performance of the coatings.

Preferably, the emulsion copolymer comprises the copolymerization product of a monomer mixture that contains less than 5 wt. %, based on the total solids in the monomer mixture, of styrene or any vinyl aromatic monomer.

The emulsion copolymer of the present invention is copolymerized from a monomer mixture of a) one or more $C_4$ to $C_6$ alkyl(meth)acrylate with b) one or more hard vinyl monomer and c) one or more ethylenically unsaturated carboxylic acid group containing monomer.

The $C_4$ to $C_6$ alkyl(meth)acrylate monomer of the present invention is a soft monomer and may include, for example, n-butyl acrylate (BA), iso-butyl acrylate. Such monomers may be combined with up to 60 wt., or up to 40 wt., or, preferably, up to 20 wt. % of one or more other soft monomers, based on the total solids in the monomer mixture.

Suitable soft monomers for use with monomer a) of the present invention may include, for example, ethylhexyl acrylate (EHA), octyl methacrylate, isooctyl methacrylate, decyl methacrylate (n-DMA), isodecyl methacrylate (IDMA), lauryl methacrylate (LMA), pentadecyl methacrylate, stearyl methacrylate (SMA), octyl acrylate, isooctyl acrylate, decyl acrylate, isodecyl acrylate, lauryl acrylate (LA), the ($C_{12}$ to $C_{15}$) alkyl methacrylates, cyclohexylacrylate and cyclohexylmethacrylate. Preferably, soft monomers are hydrophobic monomers, such as fatty or $C_{12}$ to $C_{18}$ alkyl(meth)acrylates, such as LMA, SMA, n-DMA, and IDMA.

Suitable hard vinyl monomers b) may include, for example, (meth)acrylic ester monomers including $C_1$ to $C_3$ alkyl(meth)acrylates, such as methyl methacrylate (MMA), ethyl(meth)acrylate; $C_1$ to $C_{20}$ cycloaliphatic(meth)acrylates, such as isobornyl methacrylate and cyclohexyl methacrylate; vinyl aromatics, such as styrene, alkylstyrenes (methyl and ethyl), like alpha methyl styrene; (meth)acrylonitrile; (meth) acrylamide or substituted (meth)acrylamides.

Preferably, to avoid water sensitivity in composition made therefrom, the amount of (meth)acrylamide or substituted (meth)acrylamides used as a hard vinyl monomer ranges up to 2.5 wt. %, or, preferably, up to 1.25 wt. %, based on the total solids in the monomer mixture.

Preferably, the monomer mixture used to make the emulsion copolymer of the present invention comprises no more than 20 wt. % of a vinyl aromatic monomer, such as styrene, preferably, 15 wt. % or less, or, more preferably, 10 wt. % or less, or, even more preferably, 5 wt. % or less based on the total solids in the monomer mixture. Excess vinyl aromatic monomer will impair the outdoor durability of coatings made from the emulsion copolymer.

To improve stability in aqueous systems, the emulsion copolymer includes carboxylic acid functionality by way of c) an ethylenically unsaturated carboxylic acid group containing monomer, such as, for example, maleic acid or anhydride, itaconic acid or, preferably, methacrylic acid (MAA) and acrylic acid (AA).

Preferably, the acrylic acid is added in a polymer seed or in an initial charge to a polymerization reactor, thereby limiting any adverse impact on water swelling resistance.

Other ethylenically unsaturated acids may be used in amounts of up to 1.2 wt. %, or, preferably, from 0.03 to 0.8 wt. %, all monomer wt. % s based on the total solids in the monomer mixture, and include acids with sulfur acid functionality and phosphorus acid monomers. Suitable ethylenically unsaturated sulfur containing acid functional monomers may include, for example, sodium styrene sulfonate (SSS), and (meth)acrylamidopropane sulfonate. Examples of suitable phosphorus acid monomers may include, for example, phosphoalkyl(meth)acrylates such as phosphoethyl methacrylate.

Preferably, the emulsion copolymer comprises the reaction product of less than 2 wt. %, or, more preferably, less than 0.5 wt. %, based on the total solids in the monomer mixture of a multi-ethylenically unsaturated monomer. The resulting emulsion copolymer is more linear and has greater elongation %.

Preferably, to enhance dirt pickup resistance, the emulsion copolymer comprises from 0.1 to 6 wt. %, preferably, 0.5 to 5 wt. %, based on the total solids in the monomer mixture, of acetoacetoxyethyl methacrylate.

To reduce gel content in the emulsion copolymer of the present invention, preferably, a very low level, e.g. from 0.03 to 0.8 wt. %, based on total solids in the monomer mixture, of one or more sulfur acid monomer e.g. SSS, acts as an in-process stabilizer to significantly reduce gel formation during synthesis without hurting water resistance properties, and has no significant negative effect on water swelling. Further, the sulfur acid monomer could be used to enhance polymerization.

Preferably, the aqueous emulsion copolymer of the present invention comprises the copolymerizate of one or more adhesion promoting ethylenically unsaturated monomers d), such as an ethylene ureido functional ethyl methacrylate monomer. Other such suitable monomers include ureidoalkyl (meth)acrylates, ureidoalkyl (meth)acrylamides and other ureido group containing monomers such as, for example, those disclosed in U.S. Pat. No. 3,356,627 to Scott.

Polymerizable surfactant monomers may be used in the monomer mixture of the present invention in amounts of up to 1 wt. %, based on the total solids in the monomer mixture, to increase the potential scope of monomer mixtures useful to make the emulsion copolymers of the present invention. Suitable such monomers may include styrenated phenol sulfates, such as those available as Hitenol™ BC-1025 (Montello inc., Tulsa, Okla.), Aerosol™ NPES—930 (polyoxyethylene) nonylphenol (NP) ammonium sulfate (Cytec Industries, Woodland Park, N.J.), and ethoxylated styrenated phenol sulfates, such as E-Sperse™ RS-1596 and E-Sperse™ RS-1618 comprising a styrenated phenol hydrophobe with 2 equivalents of allyl glycidyl ether ethoxylated with 15 moles or ethylene oxide, sulfated and neutralized (Ethox Chemicals, Greenville, S.C.) and sodium dodecylallyl sulfosuccinate such as TREM™ LF-40 (Cognis, Cincinnati, Ohio).

The emulsion copolymer of the present invention can be prepared by emulsion polymerization techniques well known in the art for making emulsion copolymers from hydrophobic $C_6$ to $C_{24}$ alkyl(meth)acrylate monomers; however, the polymerization of the emulsion copolymer of the present invention is catalyzed by a redox polymerization method and therefore contains a reductant such as metabisulfite or sulfite salt.

Suitable polymerization catalysts for redox polymerization may include, for example, combinations of substantially water-soluble oxidants and reductants. Such suitable combinations may include various peroxides, organic peroxides, peracids, persulfates or any of their salts as oxidants, combined with sulfites, bisulfites, dithionites, metabisulfites, hypophosphites, isoascorbic acid or any of their salts, e.g. tert-butyl hydroperoxide and sodium bisulfite. Suitable amounts of such oxidants and reductants may range from 0.16 to 0.43 wt. % of oxidants and from 0.10 to 0.53% reductants, based on the total solids in the monomer mixture used to make the emulsion copolymer, or, preferably, from 0.20 to 0.42% oxidants and 0.30 to 0.50 reductants wt. %. Such initiators may be used with or without added transition metal catalysts such as iron, cobalt, or manganese salts.

Where a hydrophobic monomer is used, U.S. Pat. No. 5,521,266 discloses suitable polymerization processes for suitable for forming emulsion copolymers made from a monomer mixture containing one or more hydrophobic monomer. Especially in the case of a (meth)acrylate having an alkyl group of from 8 to 24 carbon atoms, the monomer can be complexed with a macromolecular organic compound having a hydrophobic cavity by mixing them to form a complexed mixture, and charging the complexed mixture, along with any other monomers to a reaction vessel. Alternatively, a macromolecular organic compound having a hydrophobic cavity may be added to the reaction vessel before, during or after the monomer mixture has been charged. Suitable macromolecular organic compounds having a hydrophobic cavity may include, for example, cyclodextrin and cyclodextrin derivatives; cyclic oligosaccharides having a hydrophobic cavity such as cycloinulohexose, cycloinuloheptose, and cycloinuloctose; calyxarenes; and cavitands. The ratio of hydrophobic monomer to the macromolecular organic compound having a hydrophobic cavity may range from 1:5 to 5000:1, preferably 1:1 to 1000:1.

The emulsion copolymer of the present invention may have a weight average particle size of from 80 to 500 nm, such as, for example, a relatively large particle size of from 200 to 500 nm which improves adhesion and increases the critical % PVC of compositions containing them, i.e. the non-binder loading capacity of the coating compositions. Suitable conventional emulsion polymerization methods for making emulsion copolymers may include, for example, polymerizing in the presence of from 0.01 to 1 wt. %, based on the total weight of monomers used to make the copolymer, of one or more surfactants, or, preferably, in the presence of small amounts of surfactant, such as, for example, from 0.01 to 0.4 wt. %, based on the total weight of monomers used to make the copolymer, preferably, 0.08 to 0.32 wt. %. More preferably, large particle size emulsion copolymers may be formed by polymerizing the monomer mixture under low shear during polymerization, increasing the ion balance or salt concentration of the composition before, during or after polymerization and in use, and combinations thereof. In addition, use of an amount of surfactant below 0.4 wt. %, based on the total weight of monomers, may improve the water resistance of coatings or films made from the coating compositions.

Suitable emulsion copolymers have a weight average molecular weight of 100,000 to 2,000,000, preferably 250,000 or more, or, preferably, 1,000,000 or less. In addition, use of emulsion copolymers of such a molecular weight enable an increase in the critical % PVC of compositions containing them.

To control the molecular weight of the emulsion copolymer of the present invention, chain transfer agents, such as, for example, alkyl mercaptans, halogen compounds may be used. Preferably, the chain transfer agent is hydrophobic, such as n-dodecyl mercaptan (n-DDM or DDM) or any $C_4$ to $C_{18}$ mercaptan.

Preferably, to insure a high solids content in the aqueous compositions of the present invention, chain transfer agents (CTA) such as, for example, n-dodecylmercaptan should be used in amounts ranging from 0 wt. %, or 0.01 wt. %, based on the weight of total solids in the monomer mixture, to 0.3 wt. %, or, more preferably, 0.2 wt. % or less, or, more preferably, 0.1 wt. %, or less. Use of such low amount of the CTA in an emulsion copolymer avoids an increase in water swell or a decrease in elongation in coatings made from the emulsion copolymers.

In one example of a suitable emulsion polymerization method, the monomer mixture is subject to gradual addition emulsion polymerization with a redox initiator combination and from 0.01 to 0.4 wt. %, based on total dry monomer weight, of a nonionic and/or anionic surfactant.

Another suitable emulsion polymerization method comprises shot polymerization with up to 0.2 wt. % of surfactant, based on the total solids in the monomer mixture and a preferred level of chain transfer agent.

The aqueous coating compositions of the present invention may comprise 15 to 65 wt. % of emulsion copolymer solids, preferably, 40 wt. % or more, or, more preferably, 50 wt. % or more, all wt. %s based on the total solids of the compositions, including any fillers, extenders and pigments and any solid additive present in a coating or film made from the compositions.

The solids level of aqueous coating compositions may range 15 wt. % or higher and up to 80 wt. %, preferably, 40 wt. % or higher, or, more preferably, 50 wt. % or higher, or, even more preferably, 60 wt. % or higher.

Preferably, the coating compositions of the present invention have a VOC content of 100 g/L or less, preferably, 50 g/L or less.

The aqueous compositions of the present invention can have a % PVC of from 20 to 55 or, preferably, 30 to 50, or, more preferably, from 35 to 45. Total volumes of pigment, extender and/or opacifier in excess of 50% PVC will impair elongation whereas a lack of sufficient volume of such material can impair tensile strength of a coating made from the aqueous compositions of the present invention. To insure proper adhesion to substrates, the % PVC of suitable pigmented compositions is 50% or below, such as 20% to 50%.

Preferably, the compositions are pigmented and also contain extenders or fillers. Suitable pigments may be, such as, for example, titanium dioxide, hollow sphere or void containing or polymer pigments, or iron oxides. Suitable extenders may be, for example, calcium carbonate, clay, mica, talc, alumina silicates, aluminum trihydrate, nepheline syenite or mixtures of any of these with other extenders.

Clearcoat compositions may be formulated with extenders and no pigments.

Compositions of the present invention may also comprise one or more hydrophilic polymeric dispersant, such as a polymethacrylic acid, or a polyacid salt, e.g. alkali(ne) metal salt, for example, polyMAA, its Na salt. Any hydrophilic dispersant that can stabilize pigments, extenders and/or fillers and wet out substrate surface in use may be used, such as, for example, copolymer dispersants like Tamol™ 851 (Na poly(MAA)) or 1124 (poly(AA-co-hydroxypropyl acrylate)) dispersants (Dow Chemical, Midland, Mich.), or Rhodoline™ 286N dispersants (Rhodia, Cranbury, N.J.), hydrophilic copolymer acid salts, alkali soluble polymer or resin salts, and phosphoethyl methacrylate (PEM) polymer and copolymer dispersants.

Suitable hydrophilic polymeric dispersants may contain the polymerization product of less than 30 wt. %, or, preferably, 20 wt. % or less, based on the total weight of monomers used to make the copolymers, of monomers like alkyl(meth)acrylates, dienes or olefins other than hydrophilic acid monomers. Preferred hydrophilic dispersants may have a weight average molecular weight of 5,000 or more, preferably 8,500 or more.

Hydrophilic polymeric dispersants do not include emulsion copolymer dispersants or block copolymer dispersants comprising more than 20 wt. %, based on the total weight of copolymerized monomers, of a block that would not form a water soluble homopolymer (≥50 g/L dissolves at room temp upon mixing) at the weight average molecular weight of the dispersant block in use. Thus, if a block of a monomer in a block copolymer has a weight average molecular weight of 1,000 in the dispersant, then a homopolymer having a weight average molecular weight of 1,000 of the same monomer used to make the block in the dispersant is evaluated to see if it is water soluble.

To avoid excessive water sensitivity, and possible loss of adhesion, hydrophilic dispersants should be used in amounts of 2 wt. % or less, based on the total pigment, filler and extender solids in the compositions.

To reduce tack in coatings made therefrom, the compositions of the present invention may comprise one or more compound, such as a multivalent metal ion or ion containing compound, oxide, hydroxide and/or salt. Multivalent metal ions such as calcium, magnesium, zinc, aluminum, iron, tungsten, zirconium, barium and strontium ions, may be used. Complexes of multivalent metal ions, such as zinc hexammonium, zinc ammonium carbonate, and zirconium ammonium carbonate, and salts of multivalent metal ions with counterions, such as chloride, acetate, bicarbonate and the like, may be used to supply the ions. Oxides or hydroxides, such as those of zinc or zirconium may be used. Zinc is the most commonly used multivalent metal ion. The amount of multivalent metal ion in the compositions can be controlled to achieve a tack-free coating and this is accomplished by controlling the molar ratio of added multivalent metal ion to equivalents of carboxylic acid in the aqueous emulsion copolymer compositions. Suitable amounts include a molar ratio of multivalent metal or metal ion to carboxylic acid ranging, for example, from 0.02:1 to 1:1 or, preferably, from 0.08:1 to 0.7:1. Such amounts of these ions or compounds do not alter the color of coatings made from compositions containing them.

Preferably, to avoid the cost and potential health or environmental risks of using multivalent metal ion containing compounds, the compositions of the present invention may be substantially zinc free or substantially multivalent transition metal ion free. Such compositions should have a % PVC of 43 or higher and should comprise emulsion copolymers copolymerized from a monomer mixture comprising (meth)acrylonitrile or a hard vinyl monomer, such as a $C_1$ to $C_3$ alkyl (meth)acrylate to raise the Tg of the emulsion copolymer to avoid tack in coatings made therefrom.

Preferably, improved adhesion is observed in coatings made from compositions comprising one or more hydrolysable silanes or alkoxy silanes, which preferably have two or three hydrolysable groups. Suitable amounts of epoxysilane, aminosilane, vinyl alkoxysilane are the same. Combinations of the epoxysilanes and aminosilanes may be used.

Suitable aminosilanes may comprises an amino-alkyl functional group and is hydrolysable, having, for example, one or more alkoxy group or aryl(alkyl)oxy functional group. Preferably, the amino silane has two or more amino functional groups and two or, more preferably, three hydrolysable groups, i.e. tri-alkoxy.

Examples of suitable aminosilanes include Momentive™ Silquest™ A-1120 (Momentive Performance Materials, Albany, N.Y.) or Dow-Corning Z-6020 (Dow Corning, Midland, Mich.), each of which are aminoethylaminopropyl trimethoxysilanes. Other suitable silanes include, for example, Momentive™ Silquest™ A-174 which is methacryloxypropyltrimethoxysilane, Dow Corning Z-6040 (Dow Corning, Midland, Mich.), which is glycidoxypropy trimethoxysilane, and Silquest Wetlink™ 78, (Momentive Performance Materials, Albany, N.Y.), a glycidoxypropylmethyl diethoxysilane.

Silanes may be used in amounts ranging from 0.2 wt. % or more, or up to 2.0 wt. %, preferably, 0.5 wt. % or more, or, preferably 1.5 wt. % or less, or, more preferably, 0.7 wt. % or more, based on the total weight of emulsion copolymer solids.

The compositions of the present invention may additionally comprise one or more of thickeners, such as hydroxyethylcellulose (HEC) or modified versions thereof, UV absorbers, surfactants, coalescents, wetting agents, thickeners, rheology modifiers, drying retarders, plasticizers, biocides, mildewicides, defoamers, colorants, waxes, and silica.

To insure enhanced weatherability, the compositions may preferably include one or more UV absorber or light stabilizer, such as benzophenone (BZP), or butylated hydroxytoluene (BHT) or hindered amines in the total amount of from 0 to 1 wt. %, based on the total solids of the composition, preferably, 0.05 wt. % or more or up to 0.5 wt. %.

Preferably, to reduce the toxicity and environmental issues in the aqueous compositions of the present invention, the compositions of the present invention comprise no or substantially no (350 ppm or less) of benzophenone but retains the same good dirt pick up resistance in coatings as those made from compositions which contain 0.3 wt. %, based on total composition solids, of benzophenone.

The aqueous compositions of the present invention may be prepared by mixing the elastomeric binder with conventional components in high speed dispersion equipment such as a Cowles disperser, or a Sigma mill for caulks and sealants.

To formulate the coating compositions of the present invention with a silane, the silane can be added with stirring, such as overhead stirring, preferably before pigments, fillers or extenders are added.

Preferably, the pigmented compositions are suitable for making white roof coatings or white roof maintenance coatings.

The compositions of the present invention are preferably used as topcoats or topcoat maintenance coatings, especially if formulated with UV absorbers or light stabilizers, or can be used as the basecoat or maintenance basecoats in two coat system, e.g. with the same or different topcoat or mastic.

The compositions of the present invention may be applied to a wide variety of weathered and unweathered roofing substrates, such as, for example, asphaltic coatings, roofing felts, synthetic polymer membranes, foamed polyurethane, for example, spray polyurethane foam, and metals, such as aluminum; or to previously painted, primed, undercoated, worn, or weathered substrates, such as metal roofs weathered TPO, weathered silicone rubber and weathered EPDM rubber. Other suitable substrates include modified bitumen membrane.

Preferably, substrates can be prepared for coating with cleaning or treatment by physical abrasion, flame ionization, powerwashing with water, applying an aqueous cleaning solution, such as, for example, from 5 to 10 wt. % trisodium phosphate, or other cleaning agents, followed by powerwashing with water, or plasma treatment prior to coating.

For use on weathered TPO substrates, the compositions formulations of the present invention, preferably are substantially free of zinc oxide, zinc containing additives or zinc ions. Zinc reduces the adhesion of the coating to weathered TPO. Accordingly, the compositions are substantially zinc free and contain less than 750 ppm of Zn, whether as metal, ions or as that portion of a compound that is itself zinc, the weight based on the total solids of the composition, preferably less than 100 ppm.

EXAMPLES

The following Examples illustrate the advantages of the present invention. Unless otherwise stated, all conditions are standard pressure and room temperature.

Test Methods: The following test methods are used in the Examples.

Mechanical Properties: Tensile Max tested by ASTM D-2370 (December, 2010), requirement is 1.4 minimum MPascal and specimen is 75 mm long and 13 mm wide, tested at 23° C. with crosshead speed of 25 mm/min, gage length of 25 mm; Elongation at Break tested by ASTM D-2370 (December, 2010) specimen is 75 mm long and 13 mm wide, tested at 23° C. with crosshead speed of 25 mm/min, gage length of 25 mm. Elongation must be 100% minimum after 1000 hours; Weather-O-Meter™ exposure: Weather-O-Meter™ accelerated weathering method is ASTM D4798 (January, 2011) for the indicated time period; Cycle used was A, uninsulated black panel temperature is 63° C., daylight filter is used, total minimum radiant energy used is 1260 $kJ/(m^2 \ nm)$ at 340 nm, 151.2 $MJ/m^2$ at 300 to 400 nm.

Dirt Pick Up Resistance (DPUR) by ASTM D-3719 (April, 1995) includes several steps: Drawdown one pass of 1000 micron (40 wet mil) coating on a 7.5 cm×22.5 cm (3×9") aluminum panel. Dry the coated panel 3 days in at 23° C. and 50% relative humidity then expose to QUV light using A-Bulb (available from Q-Lab of Cleveland Ohio) for 24 hours; remove, then apply iron oxide dirt slurry to bottom half of coated panel; dry minimum 2 hrs. Under cold running tap water, scrub off dried dirt slurry with cheesecloth, dry minimum 2 hrs, measure Y-reflectance, reported is percent of original reflectance retained. The test method calls for 24 hour exposure to QUV light (w/ UV) but can be run without the QUV exposure (w/o UV or no UV). Desirable performance is a Y-reflectance value of 0.80 or higher.

Low Temperature Flexibility (LT Flex or Low Temp Flex): Flexibility was tested using ASTM D522, (February 2008) Method B: Apply product at uniform thickness to a 7.5 cm×22.5 cm aluminum substrate to result in a dry film thickness of 0.36 mm (0.014 in.) and allow to cure 72 h at 23° C. (73.4° F.) and 50% relative humidity followed by 120 h at 50° C. Coating composition is required to pass without cracking over 13 mm (0.5 in.) mandrel at −26° C. (−15° F.).

Adhesion to Polyurethane Foam: Dry and Wet Adhesion: Adhesion was tested using ASTM C794 (October, 2010) method. Unless otherwise stated, all substrates were spray polyurethane foam roofing. The coating was applied by brush at a spread rate to provide 0.5 mm thickness of dry coating (i.e. 0.126 g of wet coating/square centimeters). While the coating was still wet, a 2.56 cm wide piece of cotton airplane scrim is embedded in the coating and additional 0.06 g of wet coating/square centimeter was applied on top of the scrim. Unless otherwise indicated, the coating was allowed to dry for 14 days at 25° C./50% relative Humidity. Alternatively, the coated panel was dried in a 50 to 60° C. oven or in a vacuum oven. Half of the scrim was then pulled from the substrate at a 180 degree angle using an Instron tensile tester (Model Instron Engineering Corp., Canton, Mass.) at a pull rate of 4.8 cm/min. The coated panel was then immersed for 7 days in water and the remaining half of the scrim was immediately pulled with the tester while the coated panel was still wet.

Unless otherwise indicated, no preparation, pretreatment or cleaning of the substrate was performed. Criteria for good adhesion performance is a minimum adhesion peel value for wet adhesion of 350 Newtons (N) per meter (m) with a failure mechanism that is cohesive, C, or delamination, D, but not adhesive, A.

Water Permeance (Perms): Permeability was tested according to ASTM D1653 (June, 2008). A 0.5 mm (0.02 in.) thickness film sample was used. Test conditions: 23° C. (73.4° F.) at 50% RH. Test is run in the inverted position with water in contact with the film. Value after equilibrium is reported in SI and inch-pound units. A maximum value of 2875 ng (Pa·s·m2) (50 US perms) is acceptable.

Water Absorption: Was tested according to ASTM D471 (January, 2013) with a maximum acceptable swelling of 20% after 7, 14 or 28 days soaking in water at the indicated temperature but below 6%, or, preferably, below 5%, and at 70° C., below 5%. For 7, 14 and 28 day testing, after the indicated soak period, specimens are blot dried, and weighed; for high swell testing, the specimens are removed periodically during soaking blot dried and weighed and returned to soak so that multiple swelling events are plotted and the high swell % is recorded at the end of the indicated soak period. In Resoak testing, after an initial 7 day soak at the indicated temperature, the specimens are removed from water, dried for 7 days at 23° C. and 50% R.H. and then resoaked for the indicate period of time at the indicated temperature. High swell, 70° C. swell and resoak swell are all desirably as low as possible and, preferably, lower than the room temperature swelling value. In the Examples that follow, the following chemical abbreviations are used: BA: Butyl Acrylate; BZP: benzophenone; MMA: Methyl Methacrylate; IA: Itaconic Acid; SSS: 4-Vinylbenzene Sulfonic Acid, Sodium Salt; EUEMA: 2-Ethyleneurea ethyl methacrylate; NaPS: Sodium Persulfate; TBHP: tert-Butyl Hydroperoxide; SSF: Sodium Sulfoxylate Formaldehyde; FeSO$_4$: Ferrous Sulfate; Na$_4$EDTA: Ethylene Diamine Tetraacetic Acid Tetrasodium salt; sodium dodecylbenzene sulfonate; Na$_2$CO$_3$: Sodium Carbonate, n-DDM: n-dodecyl mercaptan; IAA: D-(−)-Isoascorbic acid; RHODACAL™ DS 4 or DS4 or SDBS is sodium dodecylbenzene sulfonate (CAS#69227-09-4, solids content 22.5 wt. %, Rhodia Bristol, Pa. US); anhydrous sodium dithionite (CAS#7775-14-6); Disponil™ FES-32: sodium lauryl ether sulfate (4 EO units, solids content 31 wt. %, Cognis, Cincinnati, Ohio); Bruggolite FF6: a mixture of disodium salts of 2-hydroxy-2-sulfinatoacetic acid (CAS#223106-41-0), and 2-hydroxy-2-sulfonatoacetic acid (CAS#29736-24-1) and sodium sulfite (CAS#7757-83-7) ((Brüggemann Chemical US, Inc., Philadelphia, Pa. US)).

Synthesis Examples

Example 2

To a 5 L reactor equipped with a mechanical stirrer, thermocouple, condenser and a stainless steel feed ports was charged 550 gm of deionized (DI) water; and the reactor was warmed to 88° C. in a nitrogen atmosphere. With the reactor water at 88° C., the following materials were added: 1.20 gm of sodium carbonate in 35 gm of DI Water, 3.40 gm of an aqueous ammonium hydroxide (30%), 3.00 gm of ammonium persulfate in 30 gm of DI Water and 151.4 gm of a 100 nm preformed emulsion polymer seed (52 MMA/46.7 BA/1.3 MAA (all wt. % s)) at 45% solids content and 20 gm of DI Water, 3.00 gm of sodium metabisulfite (NaMBS) and 35 gm of DI Water and 0.013 gm of ferrous sulfate heptahydrate, 0.013 gm of Na$_4$EDTA (Versene™ 120, Dow Chemical, Midland, Mich.) and 10 gm of DI Water. Immediately after this, a monomer emulsion (ME) prepared by mixing the reagents in the order listed in Table A below, was transferred to the reactor at 8.27 gm/min a FMI (Fluid Meter Incorporated, Syosset, N.Y.) pump. In addition to the ME, a solution composed of 4.69 gm ammonium persulfate, 1.00 gm of tert-amyl hydroperoxide (85%, tAHP)), 1.78 gm of Disponil™ FES-32 Surfactant and 200 gm of DI water and a solution composed of 7.09 gm of sodium metabisulfite (NaMBS), 2.6 gm of aqueous ammonium hydroxide (30%) and 200 gm of DI water at 0.62 gm/min. After 20 minutes, the ME addition rate was increased to 16.55 gm/min and both the APS and NaMBS solutions were increased to 1.22 gm/min. Total feed time was 180 minutes. The temperature was maintained between 82-83° C. After 1136 gm of the ME had been feed to the reactor, 47.10 gm of ureidoethyl methacrylate (EUEMA, monomer (d)) and 10 g of DI water was added to the ME with agitation. After the ME feed had been completed, 105 gm of DI Water was added to the reactor to rinse the ME transfer line. At 80° C., a solution (a) composed of 2.30 g of tert-butyl hydroperoxide (70%, tBHP) and 50 g of DI Water and a solution (b) composed of 2.00 g of sodium formaldehyde sulfoxylate (SSF) and 50 g of DI Water were transferred to the reactor at 0.70 g/min. The reactor contents were cooled to 50° C. during the addition of solutions (a) and (b). When the reactor temperature was 50° C. and solutions (a) and (b) added, 18.3 g of aqueous ammonium hydroxide (30%) and 15 g of water was added to the reactor at 1.89 g/min. After the ammonium hydroxide solution had been added, 10.3 g of Rocima™ BT2S biocide (The Dow Chemical Company, Midland, Mich.) and 15 g of water was added at 2.03 g/min. The reactor contents were to cooled to <35° C. and filtered through a 150 micron (#100 Mesh) and 45 micron (#325 Mesh) sieves and isolated. Analysis of the resulting emulsion afforded the following properties: 54.3% solids, pH 9.0, particle size 337 nm (BI90 Plus), contained 300 g of gel (150 micron) and <5 ppm (trace) gel (45 micron). The emulsion contained 270 ppm of unreacted BA and 0 ppm MMA.

Example 3

The emulsion copolymer was prepared as described in Example 2, above except the monomer emulsion (ME) composition was as indicated in Table A, above. Analysis of the resulting emulsion afforded the following properties: 56.4% Solids, pH 9.00, particle size 335 nm (BI90 Plus), 232 g of gel (150 micron), 79 g of gel (45 micron), 300 ppm of 2-EHA and 2 ppm MMA.

Example 4

The emulsion copolymer was prepared as described in Example 2, above, except the monomer emulsion (ME) composition was as indicated in Table A, above. Analysis of the resulting emulsion afforded the following properties: 55.5% Solids, pH 8.5, particle size 346 nm (BI90 Plus), 24 g of gel (150 micron), trace of gel (45 micron), 346 ppm of unreacted 2-EHA, 0 ppm STY and 0 ppm MMA.

Example 5

The emulsion copolymer was prepared as described in Example 2, above, except the monomer emulsion (ME) composition was as indicated in Table A, above. Analysis of the emulsion afforded the following properties: 56.5% Solids, pH 8.80, particle size of 323 nm (BI90 Plus), 32 g of gel (150 micron) and trace 45 micron gel. The emulsion contained 175 ppm of unreacted BA and 0 ppm MMA.

Example 6

This polymer was prepared as described in Example 2, above, with the monomer mix as indicated in Table A, above, except NaMBS was replaced with an equal weight of Brugolite™ FF6. Analysis of the emulsion afforded the following properties: 56.2%, pH 8.40, particle size of 330 nm (BI90 Plus), 300 g of gel (150 micron), and trace 45 micron gel. The emulsion contained 394 ppm of BA and 0 ppm MMA.

TABLE A

Monomer Mixtures

| | Copolymer Example | | | | |
|---|---|---|---|---|---|
| | 2 | 3 | 4 | 5 | 6 |
| DI Water | 480 | 480 | 480 | 480 | 480 |
| DS4 | 11.9 | 11.9 | 11.9 | 11.9 | 11.9 |
| BA | 2001.9 | 869.9 | | 1999.7 | 2001.9 |
| MMA | 290.9 | 527.5 | 406.0 | 290.9 | 290.9 |
| MAA | 38.9 | 38.9 | 38.9 | 29.5 | 38.9 |
| 2-EHA | | 894.9 | 1625.0 | | |
| AAEM | | | 117.8 | | |
| STY | | | 143.6 | | |
| SSS | | | | 11.75 | |

Example 7

A 5 L reactor was charged with 671 g of DI water in a nitrogen atmosphere. With the reactor water at 22° C., the following materials were added: 1.20 g of sodium carbonate in 35 g of DI Water, 3.40 g of an aqueous ammonium hydroxide (30%), and 151.4 g of a 100 nm preformed emulsion polymer seed (52 MMA/46.7 BA/1.3 MAA, all wt. % s) at 45% solids content and 20 g of DI Water, and 355.1 g of the ME described in Table A, Example 2. At 22° C., the following solutions were added in less than minute: 6.18 g of sodium persulfate in 40 g of DI Water, 2.94 g of anhydrous sodium dithionite in 40 g of DI Water and 0.013 g of ferrous sulfate heptahydrate, 0.013 g of Na$_4$EDTA (Versene™ 120, Dow) and 10 g of DI Water. An exothermic reaction was observed with the reactor temperature increasing to 64° C. over 22 minutes. The ME was transferred to the reactor at 7.5 g/min. In addition to the ME, two cofeed solutions were added to the reactor: a solution composed of 3.80 g sodium persulfate in 115 g of DI water and a solution composed of 9.55 g of sodium metabisulfite (NaMBS) in 115 g of DI water at 0.34 g/min. After 20 minutes, the ME addition rate was increased to 15.0 g/min and both the cofeed solution rates were increased to 0.68 g/min. Total feed time was 180 minutes. The temperature was maintained between 65-66° C. After 1136 g of the ME had been feed to the reactor, 47.10 g of EUEMA and 10 g of DI water was added to the ME with agitation. After the ME feed had been completed, 105 g of DI Water was added to the reactor to rinse the ME transfer line. At 65° C., a solution composed of 2.6 g of aqueous ammonium hydroxide (30%) and 60 g of DI Water was added to the reactor. Next a solution of composed of 2.30 g of tert-butyl hydroperoxide (70%) and 50 g of DI Water and a solution composed of 2.00 g of sodium formaldehyde sulfoxylate (SSF) and 50 g of DI Water were transferred to the reactor over 1 hour, while the reactor contents were cooled to 50° C. After the tBHP and SSF solutions had been added to the reactor and the reactor temperature was 50° C., 16.8 g of aqueous ammonium hydroxide (30%) and 15 g of water was added to the reactor over 15 minutes followed by the addition of a solution composed of 10.3 g of Rocima™ BT2S biocide (Dow) and 15 g of water that was added to the reactor over 10 minutes. The reactor contents were to cooled to <35° C. and filtered through a #100 and #325 Mesh sieves and isolated. Analysis of the resulting emulsion afforded the following properties: 53.88% solids, pH 8.57, particle size 446 nm (BI90 Plus), a viscosity of 61 cPs (LV#2, 60 rpm), contained 61 ppm of gel (150 micron) and <5 ppm (trace) 45 micron gel. The emulsion contained 3468 ppm of unreacted BA and 6 ppm MMA.

Example 8

The emulsion copolymer was prepared in the same manner as Example 7, above, except that no polymer seed described in Example 2 was added to the reactor. Analysis of the resulting emulsion afforded the following properties: 53.19% solids, pH 8.59, a viscosity of 45 cPs (LV#2, 60 rpm), 36 ppm of gel (150 micron) and 36 ppm 45 micron gel. The emulsion contained 5154 ppm BA and 13 ppm MMA.

Example 9

The emulsion copolymer was prepared the same as Example 2 above, with the following changes: 85 g of the ME described in Table A, Example 2 was transfer to the reactor following the addition of the preformed emulsion polymer seed. The cofeed solution composed of ammonium persulfate contained no t-AHP. The polymerization temperature was 70° C. Analysis of the resulting emulsion afforded the following properties: 55.71% solids, pH 8.53, a viscosity of 122 cPs (LV#2, 60 rpm), 20 ppm of gel (150 micron) and 10 ppm 45 micron gel. The emulsion contained 98 ppm BA and 0 ppm MMA.

Example 10

The emulsion copolymer was prepared as Example 9, above, except 1.76 g of sodium styrene sulfonate (SSS) was added to the ME composition described in Table A, Example 2. The polymerization temperature was 70° C. Analysis of the resulting emulsion had the following properties: 55.18% Solids, pH 8.56, a particle size of 320 nm, a viscosity of 98 cPs (LV#2, 60 rpm), 98 ppm of gel (150 micron) and 10 ppm of 45 micron gel. The emulsion contained 404 ppm of unreacted BA and 0 ppm MMA.

Example 11

The emulsion copolymer was prepared as Example 2 above, except 85 g of the ME described in Table A, Example 2 was transfer to the reactor following the addition of the preformed emulsion seed polymer and 1.0 gm of tert-amyl hydroperoxide (tAHP) and 1.78 gm of Disponil™ FES-32 surfactant was added to the ammonium persulfate cofeed solution. The polymerization temperature was 70° C. Analysis of the resulting emulsion afforded the following properties: 55.59%, pH 8.58, a particle size of 315 nm, 38 ppm of gel (150 micron) and 24 ppm 45 micron gel. The emulsion contained 460 ppm of unreacted BA and 0 ppm MMA.

Example 12

MDW019070

The emulsion copolymer was prepared as Example 11 above, except 10 gm of MAA was shifted from the ME composition to the reactor after addition of the preformed emulsion polymer seed. Analysis of the resulting emulsion afforded the following properties: 55.92%, pH 8.58, a particle size of 439 nm, a viscosity of 82 cPs (LV#2, 60 rpm), 6 ppm of gel (150 micron) and 6 ppm 45 micron gel. The emulsion contained 206 ppm of unreacted BA and 0 ppm MMA.

Comparative Example 13

The emulsion copolymer was prepared as in Example 11, above, except the ME was composed of 490 g of DI Water, 11.9 g of DS4, 1919.1 g of BA, 290.9 g of MMA, 19.5 g of MAA and 4.71 g of SSS. 14.7 g of Itaconic acid (IA) was added to the reactor before the addition of the aqueous sodium carbonate solution. Analysis of the resulting emulsion afforded the following properties: 55.82% solids, pH 8.58, a particle size of 580 nm, 102 ppm #100 Mesh gel and 12 ppm #325 Mesh gel. The emulsion contained 1908 ppm unreacted BA and 0 ppm MMA.

Example 14

A 5 L reactor was charged with 550 gm of DI water in a nitrogen atmosphere. With the reactor water at 35° C., 151.4 gm of a 100 nm preformed emulsion polymer seed (52 MMA/ 46.7 BA/1.3 MAA) at 45% solids content and 20 gm of DI Water, and 252.0 gm of the ME prepared by mixing the reagents in the order listed in Table B, below. Immediately, the following solutions were added in less than minute: 3.00 gm of ammonium persulfate in 30 gm of DI Water, 2.16 gm of sodium metabisulfite in 30 gm of DI Water and 0.013 gm of ferrous sulfate heptahydrate, 0.013 gm of $Na_4EDTA$ (Versene™ 120, Dow) and 10 gm of DI water. An exothermic reaction was observed with the reactor temperature increasing to 70° C. over 8 minutes. After the temperature peaked, an aliquot of the emulsion was analyzed and the particle size was 158 nm (BI90 Plus) and the ME was transferred to the reactor at 8.7 gm/min. In addition to the ME, two cofeed solutions were added to the reactor: a solution composed of 4.69 gm ammonium persulfate, 1.00 gm of tAHP, 1.70 gm of Disponil™ FES-32 in 200 gm of DI water and a solution composed of 7.09 gm of sodium metabisulfite (NaMBS) in 200 gm of DI water at 0.68 gm/min for both solutions. After 20 minutes, the ME addition rate was increased to 17.5 gm/min and the two cofeed solution feed rates were increased to 1.34 gm/min. Total feed time was 150 minutes. The temperature was maintained between 69-71° C. After 1410 gm of the ME has been feed to the reactor, 27.7 gm of MAA, 9.4 gm of AA and 10 gm were added to the ME with agitation. After 2110 gm of the ME had been feed to the reactor, 28.4 gm of EUEMA and 10 gm of DI water was added to the ME with agitation. After the ME feed had been completed, 120 gm of DI Water was added to the reactor to rinse the ME transfer line. At 70° C., a solution composed of 8.56 gm of aqueous ammonium hydroxide (30%) and 15 gm of DI Water was added to the reactor. Next a solution of composed of 2.56 gm of tert-butyl hydroperoxide (70%) and 55 gm of DI Water and a solution composed of 3.00 gm of sodium formaldehyde sulfoxylate (SSF) and 55 gm of DI Water were transferred to the reactor over 1 hour. The reactor contents were cooled to 50° C. during the addition of these two solutions. After the tBHP and SSF solutions had been added to the reactor and the reactor temperature was 50° C., 18.0 gm of aqueous ammonium hydroxide (30%) and 15 gm of water was added to the reactor over 15 minutes followed by the addition of a solution composed of 10.3 gm of Rocima BT 2S and 15 gm of water that was added to the reactor over 10 minutes. The reactor contents were to cooled to <35° C. and filtered through a #100 and #325 Mesh sieves and isolated. Analysis of the resulting emulsion afforded the following properties: 55.98% solids, pH 8.93, particle size 318 nm (BI90 Plus), a viscosity of 316 cPs (LV#2, 60 rpm), contained 34 ppm of gel (150 micron) and 17 ppm (trace) (45 micron) gel. The emulsion contained 288 ppm of unreacted BA and 0 ppm MMA.

TABLE B

Monomer Emulsions (Excluding Adhesion Promoters)

| | Copolymer Example | | | | | |
|---|---|---|---|---|---|---|
| | 14 | 15 | C16 | 17 | C18 | 19 |
| DI Water | 490 | 490 | 476 | 432 | 476 | 476 |
| DS4 | 11.9 | 11.9 | 10.7 | 10.7 | 10.7 | 10.7 |
| BA | 2001.6 | 2001.6 | 1589.6 | 1589.6 | 1589.6 | 1589.6 |
| MMA | 291.1 | 291.9 | 262.8 | 262.8 | 262.8 | 262.8 |
| MAA | 27.7 | 27.7 | 35.0 | 35.0 | 26.2 | 26.2 |
| 2-EHA | | | 212.0 | 212.0 | 212.0 | 212.0 |
| AAEM | | | | | | |
| STY | | | | | | |
| SSS | 11.6 | 11.4 | | | | |
| AA | 9.44 | 9.44 | | | | |

Example 15

The emulsion copolymer was prepared as described in Example 14, above, except the MAA was added to the reactor after the addition of the preformed emulsion polymer seed and the ME seed charge. Analysis of the resulting emulsion afforded the following properties: 55.70% solids, pH 8.98, particle size 311 nm (BI90 Plus), a viscosity of 238 cPs (LV#2, 60 rpm), contained 34 ppm of gel (150 micron) and 58 ppm of gel (45 micron). The emulsion contained 277 ppm of unreacted BA and 0 ppm MMA.

Comparative Example 16

The emulsion copolymer was prepared as described in Example 2, above, except the ME composition was changed to the composition described in Table B, above, a thermal initiation process was used and the weights of all reagents were reduced by 10 wt. %. Final batch weight was 3970 gm vs. 4400 gm. Analysis of the resulting emulsion afforded the following properties: 54.20% Solids, pH 9.3, a particle size of 332 nm (BI90 Plus), trace gel content for both 150 micron and 45 micron sieves. The emulsion contained 204 ppm unreacted BA, 0 ppm 2-EHA and 0 ppm MMA.

Example 17

The emulsion copolymer was prepared as described in Example 2, except the ME composition was changed to the composition described in Table B, above, the NaMBS was replaced with an equal weight of Bruggolite™ FF6 and the weights of all reagents were reduced by 10 wt. %. Final batch weight was 3970 gm vs. 4400 gm. Analysis of the emulsion afforded the following properties: 55.30%, pH 9.30, a particle size of 325 nm, 26 ppm of gel (150 micron) and trace gel for 45 micron sieve. The emulsion contained 70 ppm of unreacted BA, 0 ppm 2-EHA and 0 ppm MMA.

Comparative Example 18

The emulsion copolymer was prepared as described in Example 16 above, except 76 g of the ME and 8.8 g of the MAA was shifted from the ME were added to the reactor following the addition of the preformed emulsion polymer. Analysis of the resulting emulsion afforded the following properties: 55.50% Solids, pH 9.3, a particle size of 395 nm (BI90 Plus), and trace gel for both a 150 micron and 45 micron sieve. The emulsion contained 787 ppm of unreacted BA, 119 ppm 2-EHA and 0 ppm MMA.

Example 19

The emulsion copolymer was prepared as described in Example 17, above, except 76 g of the ME and 8.8 g of the MAA was shifted from the ME were added to the reactor following the addition of the preformed emulsion polymer. Analysis of the resulting emulsion afforded the following properties: 55.50% Solids, pH 9.3, a particle size of 376 nm (BI90 Plus), 44 ppm of gel (150 micron) and trace gel for a 45 micron sieve. The emulsion contained 489 ppm of unreacted BA, 68 ppm 2-EHA and 0 ppm MMA.

TABLE 1

Emulsion Copolymer Compositions:

| Copolymer Example | Polymer Composition | | | | | Process |
|---|---|---|---|---|---|---|
| | BA | MMA | EUEMA | MAA | BZP | |
| CE1* | 85 | 12.35 | 1 | 1.65 | 0.3 | Thermal, 85° C. |
| 7 | 85 | 12.35 | 1 | 1.65 | 0.3 | Redox 70° C., No Seed Room Temp start |
| 8 | 36.9 | 22.4 | 1 | 1.65 | 0.3 | Redox 65° C. ME Seed RT Start |

*CE1 and examples 7 & 8 polymer contains 0.3 wt. % BZP in the polymer and EUEMA at 40% of feeds. Initiator system for examples 7 and 8 was NaPS and NaBS.

All emulsion copolymer compositions were formulated as shown in Table 1A, below, to form a roof coating composition.

TABLE 1A

| Pigmented Formulation of a Coating Composition | | | |
|---|---|---|---|
| Material: Trade Name (Chemical Name) | Kilogram | Liter | % solids |
| Grind | | | |
| Water | 181.88 | 181.88 | 0 |
| Dispersant: Tamol ™,1 851 (Polyacrylic acid sodium salt) | 5.98 | 4.99 | 30.0% |
| Potassium tripolyphosphate KTPP Dispersant7 | 1.79 | 0.70 | 100% |
| Neutralizer: Ammonia (28%) | 1.20 | 1.33 | 28% |
| Defoamer: Nopco ™,2 NXZ (Mineral Oil Derivative) | 1.79 | 1.97 | 100% |
| Extender: Omyacarb ™,3 12 ™ (Natural ground calcium carbonate) | 508.04 | 188.16 | 100% |
| Pigment: Ti-Pure R-960 ™,6 (Titanium dioxide) | 89.74 | 23.18 | 100% |
| Extender: Kadox ™,8 915 (Zinc Oxide) | 53.84 | 9.74 | |
| LetDown | | | |
| Emulsion: Copolymer A (Acrylic Latex) | 586.36 | 545.17 | 55% |
| Defoamer: Nopco ™,2 NXZ (Mineral Oil defoamer) | 1.79 | 1.97 | NA |
| Coalescent: Texanol ™,4 (ester alcohol) | 7.18 | 7.56 | 100% |
| Water | 11.37 | 11.37 | 0 |
| Mildewcide:Skane ™,1 M-8 2000 (isothiazolone) | 2.39 | 2.32 | 20.0% |
| Premix: | | | |
| Solvent:Propylene Glycol | 16.75 | 16.17 | 0% |
| Thickener: Natrosol ™,5 250 MXR (Hydroxyethylcellulose) | 4.55 | 3.50 | 100% |
| Totals | 1457.17 | 1000.00 | |
| Volume Solids | | 51.11% | PVC: 43.29% |

TABLE 1A-continued

Pigmented Formulation of a Coating Composition

| Material: Trade Name (Chemical Name) | Kilogram | Liter | % solids |
|---|---|---|---|
| Density: | 1.457 Kg/L | VOC: | 46 grams/liter |
| Weight Solids: | 66.21% | Dispersant: | 0.55% |
| Coalescent: |  | 2.3% |  |

[1] Dow Chemical (Midland, MI);
[2] Cognis Corp. (Ontario, CA);
[3] Omya, Johnsonburg, PA;
[4] Eastman Chemical (Kingsport, TN);
[5] Ashland, Inc. (Covington, KY);
[6] DuPont (Wilmington, DE);
[7] Bimex Corp. (Brodheadsville, PA);
[8] Zinc Corp. of America (Monaca, PA).

TABLE 2

Performance of Coating Formulations Comprising Emulsion Copolymers of Table 1

| TEST |  | CE1 | 7 | 8 |
|---|---|---|---|---|
| Tensile Max (MPa) | Initial/WOM 100 h | 1.61/2.60 | 1.38/2.16 | 1.37/2.30 |
| Elongation @ Break % | Initial/WOM 100 h | 246/165 | 388/190 | 335/231 |
| Tear Resistance | kN/m | 26.9 | 30.8 | 32.9 |
| Swells @ RT % | Initial High Swell | 16 | 15.6 | 13.4 |
|  | 7 D | 8.8 | 10.2 | 7.9 |
| Swells @ 70° C. % | Initial High Swell | 14.5 | 16.3 | 14.3 |
|  | 7 Day | 9.2 | 12.5 | 8.6 |
| Dirt Pick Up Resistance w/ BZP % | UV | 94 | 99 | 99 |
|  | no UV | 74 | 76 | 82 |
| Low Temp Flex −26° C. | 1.2 cm mandrel | P | P | P |
| Low Temp Flex −26° C. | 0.4 cm | F | P | P |
| Wet Adhesion to SPFoam | N/m | 350 | 578 | 490 |

WOM: Weather-O-Meter;
WOM Exposure: 100 hours;
DPUR was tested without UV light so that effect of BZP was minimized;
M: Marginal Failure.

As shown in Table 2, above, the compositions of the present invention enable improved elongation, flexibility, adhesion and dirt pickup resistance from the redox polymerized emulsion copolymer.

TABLE 3

Emulsion Copolymers:

| Copolymer Example | BA | MMA | EUEMA | MAA | IA | BZP | Process |
|---|---|---|---|---|---|---|---|
| CE1* | 85 | 12.35 | 1 | 1.65 |  | 0.3 | Thermal, 85° C. Seed |
| 9 | 85 | 12.35 | 1 | 1.65 |  | 0.3 | Redox 70° C., |
| 10 | 85 | 12.35 | 1 | 1.65 |  | 0.3 | Redox 70° C., 1% SSS |
| 11 | 85 | 12.35 | 1 | 1.65 |  | 0.3 | Redox 70° C., 1% tAHP |
| 12 | 85 | 12.35 | 1 | 1.65 |  | 0.3 | Redox 70 C. MAA to ME seed |
| C13 | 85 | 12.35 | 1 | 0.6 | 0.8 | 0.3 | Redox 80 C., IA |

*CE1 and examples 9-13 contain 0.3 wt. % BZP in the polymer and EUEMA started after 40% of feeds. Examples 9-13 use NABS as initiator.

TABLE 4

Performance of Coating Formulations Comprising Emulsion Copolymers of Table 3

| TEST |  | CE1 | 9 | 10 | 11 | 12 | C13 |
|---|---|---|---|---|---|---|---|
| Tensile Max (MPa) | Initial/WOM 100 h | 1.7/2.78 | 1.75/1.0 | 1.7/3.0 | 1.7/2.9 | 1.8/3.1 | 1.6/2.8 |
| Elongation @ Break % | Initial/WOM 100 h | 263/142 | 260/194 | 276/151 | 316/168 | 187/153 | 192/156 |
| Swells @ RT % | Initial High Swell | 18 | 12 | 13 | 13 | 11 | 12 |
|  | 7 D | 9.1 | 7 | 7.1 | 7.8 | 6.4 | 6.2 |
| Swells @ 70° C. % | Initial High Swell | 17.7 | 13.2 | 13.4 | 13.5 | 10.8 | 9.4 |
|  | 7 Day | 11.9 | 10.1 | 9.7 | 10.6 | 7.5 | 5.8 |
| Dirt Pick Up Resistance w/BZP % | UV | 99 | 98 | 99 | 98 | 100 | 100 |
|  | no UV | 76 | 83 | 82 | 79 | 83 | 89 |

TABLE 4-continued

Performance of Coating Formulations Comprising Emulsion Copolymers of Table 3

| TEST | | CE1 | 9 | 10 | 11 | 12 | C13 |
|---|---|---|---|---|---|---|---|
| Low Temp Flex −26° C. | 1.2 cm mandrel | P | P | P | P | P | P |
| Wet Adhesion to SPFoam | N/M | 263 | 438 | 368 | 403 | 263 | 193 |

WOM: Weather-O-Meter; WOM Exposure: 100 hours; DPUR was tested without UV light so that effect of BZP was minimized; M: Marginal Failure.

As shown in Table 4, above, the compositions of the present invention enable improved water swelling resistance and adhesion from the selection of methacyrlic acid and a redox polymerized emulsion copolymer. Itaconic acid in Comp. Eg. 13 hurt adhesion.

TABLE 5

Emulsion Copolymer Compositions:

| Copolymer Example | Polymer Composition | | | | | | | Additive | Process |
|---|---|---|---|---|---|---|---|---|---|
| | BA | MMA | EUEMA | MAA | EHA | STY | SSS | AAEM | BZP | |
| CE1 | 85 | 12.35 | 1 | 1.65 | | | | | 0.3 | Thermal |
| 2 | 85 | 12.35 | 1 | 1.65 | | | | | | Redox |
| 3 | 36.9 | 22.4 | 1 | 1.65 | 38 | | | | | Redox |
| 4 | | 17.24 | 1 | 1.65 | 69 | 6.1 | | 5.0 | | Redox |
| 5 | 85 | 12.35 | 0.6** | 1.65 | | | 0.5 | | | Redox |
| 6 | 85 | 12.35 | 1 | 1.65 | | | | | | Redox |

*CE1 polymer contains 0.3 wt. % BZP in the polymer; 0.45 to 0.50 wt. % benzophenone was added to all other emulsion polymers prior to formulating. EUEMA at 40% of feeds for CE1 and samples 2-6. Example 6 Replaces NaMBS with FF6

TABLE 6

Performance of Coating Formulations Comprising Emulsion Copolymers of Table 5

| TEST | | CE1 | 2 | 3 | 4 | 5 | 6 |
|---|---|---|---|---|---|---|---|
| Tensile Max (MPa) | Initial | 1.63 | 1.46 | 1.48 | 1.63 | 1.67 | 1.86 |
| Tensile Break (MPa) | Initial | 1.48 | 1.43 | 1.42 | 1.46 | 1.59 | 1.66 |
| Elongation @ Break % | Initial | 223 | 257 | 272 | 195 | 219 | 220 |
| Swells @ RT % | Initial High Swell 7 D | 14.5 | 14.1 | 14.7 | 10.0 | 14.6 | 13.8 |
| Swells @ 70° C. % | Initial High Swell 7 Day | 13.7 | 13.6 | 14.2 | 10.3 | 13.5 | 14.2 |
| Low Temp Flex −26° C. | 1.2 cm mandrel | P | P | P/F | P/F | P | P |
| Low Temp Flex −26° C. | 0.4 cm | F | F | F | F | P | F |
| Wet Adhesion to SPFoam | N/m | 403 | 455 | 438 | 403 | 403 | 508 |

WOM: Weather-O-Meter; WOM Exposure: 100 hours; DPUR was tested without UV light so that effect of BZP was minimized; M: Marginal Failure.

As shown in Table 6, above, the compositions of the present invention enable an improved combination of elongation and tensile strength, as well as adhesion from the redox polymerized emulsion copolymer.

TABLE 7

Emulsion Copolymer Compositions:

| Copolymer Example | Polymer Composition | | | | | | | |
|---|---|---|---|---|---|---|---|---|
| | BA | MMA | EUEMA | MAA | EHA | AA | BZP | Process |
| CE1* | 85 | 12.35 | 1 | 1.6 | | | 0.3 | Thermal 85° C. |
| 14 | 85 | 12.4 | 0.6 | 1.1 | | 0.4 | | MAA & AA added at 50% of feeds |

TABLE 7-continued

Emulsion Copolymer Compositions:

| Copolymer Example | BA | MMA | EUEMA | MAA | EHA | AA | BZP | Process |
|---|---|---|---|---|---|---|---|---|
| 15 | 85 | 12.4 | 0.6 | 1.1 | | 0.4 | | AA added to ME seed, MAA added at 50% of feeds |
| C16 | 75 | 12.4 | 1 | 1.6 | 10 | | | Thermal 85° C. |
| 17 | 75 | 12.4 | 1 | 1.6 | 10 | | | Redox 70° C. FF6 |
| C18 | 75 | 12.4 | 1 | 1.6 | 10 | | | Thermal 80-83, 3% ME seed, 25% MAA w/ME Seed |
| 19 | 75 | 12.4 | 1 | 1.6 | 10 | | | Redox 70° C. FF6, 3% ME seed, 25% MAA w/ME Seed |

CE1 and examples 9-13 contains 0.3 wt. % BZP in the polymer. Examples 14 and 15 contain 0.6% EUEMA started after 75% of feeds. Example 16 has 0.4 wt. % BZP; Examples 16 to 19 contain 1.0% EUEMA at 40% of feeds.

TABLE 8

Performance of Coating Formulations Comprising Emulsion Copolymers of Table 7

| TEST | | CE1 | C16 | 17 | C18 | 19 | 14 | 15 |
|---|---|---|---|---|---|---|---|---|
| Tensile Max (MPa) | Initial | 1.5 | 1.4 | 1.5 | 1.6 | 1.5 | 1.4 | 1.3 |
| Elongation @ Break % | Initial | 268 | 270 | 284 | 244 | 240 | 268 | 306 |
| Tear Resistance | kN/m | 28.5 | 25.3 | 25.7 | 29.3 | 32.0 | 27.3 | 27.3 |
| Dirt Pick Up Resistance w/BZP % | UV | 100 | 100 | 99 | 99 | 99 | 96 | 97 |
| | no UV | 65 | 51 | 54 | 61 | 75 | 54 | 57 |
| Dirt Pick Up Resistance w/o BZP % | UV | — | 99 | 53 | 60 | 73 | 57 | 54 |
| | no UV | — | 57 | 66 | 77 | 60 | 61 | 67 |
| Low Temp Flex −26° C. | 1.2 cm mandrel | P | P | P | P | P | P | P |
| Low Temp Flex −26° C. | 0.4 cm mandrel | F | F | F | F | F | F | P |
| Dry Adhesion to SPFoam | N/m | 648 | 595 | 543 | 683 | 683 | 508 | 718 |

As shown in Table 8, above, the compositions of the present invention enable an improved combination of elongation and tensile strength, such as in Example 17 versus CE1 from the redox polymerized emulsion copolymer. When acrylic acid is added to a seed as in Example 15, adhesion is improved as well as flexibility, even with less adhesion promoter as in CE1.

We claim:

1. An aqueous composition for coating roofing substrates comprise (i) one or more emulsion copolymer having a glass transition temperature (Tg) of from −45° C. to −10° C. having a weight average molecular weight of from 100,000 to 2,000,000, the emulsion copolymer being the copolymerization product of a monomer mixture of (a) from 74 wt. % to 97.75 wt. % of one or more $C_4$ to $C_6$ alkyl(meth)acrylates or a mixture thereof with up to 20 wt. % of a $C_7$ to $C_{24}$ alkyl(meth)acrylate to make a total of 80 to 94 wt. %, (b) from 2 to 20 wt. % of a hard vinyl monomer, and (c) from 0.25 wt. % to 3.0 wt. % of one or more ethylenically unsaturated monofunctional carboxylic acid group containing monomer, (ii) a reductant, (iii) a combination of one or more of a pigment, extender, filler and mixtures thereof with one or more hydrophilic polymeric dispersant in a total amount so that the composition has a pigment volume concentration (% PVC) of from 20 to 55, and (iv) one or more multivalent transition metal ion or multivalent transition metal ion compound or salt, wherein the monomer mixture comprises 10 wt. % or less of any vinyl aromatic monomer; and, further wherein, the monomer mixture comprises 11 wt. % or less of (meth)acrylonitrile, all monomer weight percents are based on the total solids in the monomer mixture.

2. The aqueous composition as claimed in claim 1, wherein the emulsion copolymer is a single stage polymer.

3. The aqueous composition as claimed in claim 1, wherein the (i) one or more emulsion copolymer further comprises the copolymerization product of (c) methacrylic acid or a mixture thereof with acrylic acid.

4. The aqueous composition as claimed in claim 1, wherein the aqueous emulsion copolymer composition, further comprises the copolymerization product of a monomer mixture having monomer d) from 0.1 to 2 wt. %, based on the total solids in the monomer mixture, of an adhesion promoting ethylenically unsaturated monomer.

5. The aqueous composition as claimed in claim 1, wherein the (iv) one or more multivalent transition metal ion or multivalent transition metal ion compound or salt is zinc oxide or zinc hydroxide.

6. An elastomeric pigmented roof coating comprising (i) one or more emulsion copolymer having a glass transition temperature (Tg) of from −45° C. to −10° C., having a weight average molecular weight of from 100,000 to 2,000,000, and being the copolymerization product of a monomer mixture of (a) from 74 wt. % to 97.75 wt. %, of one or more $C_4$ to $C_6$ alkyl(meth)acrylates, or a mixture thereof with up to 20 wt. % of a $C_7$ to $C_{24}$ alkyl(meth)acrylate to make a total of 80 to 94 wt. % (b) from 2 to 20 wt. % of a hard vinyl monomer, and (c) from 0.25 wt. % to 3.0 wt. % of one or more ethylenically unsaturated carboxylic acid group containing monomer, wherein the monomer mixture comprises 10 wt. % or less of any vinyl aromatic monomer, such as styrene; further wherein, the monomer mixture comprises 11 wt. % or less of (meth)acrylonitrile, all monomer weight percents are based on the total solids in the monomer mixture, (ii) a reductant, (iii) a combination of one or more of a pigment, extender, filler and mixtures thereof with one or more hydrophilic polymeric dispersant in a total amount so that the composition has a pigment volume concentration (% PVC) of from 20 to 55, and (iv) one or more multivalent transition metal ion or multivalent transition metal ion compound or salt.

7. The coating as claimed in claim 6, wherein the (i) one or more emulsion copolymer further comprises the copolymerization product of (c) methacrylic acid or a mixture thereof with acrylic acid.

8. The coating as claimed in claim 6, wherein the (i) one or more emulsion copolymer further comprises the copolymerization product of a monomer mixture having monomer d) from 0.1 to 2 wt. %, based on the total solids in the monomer mixture, of an adhesion promoting ethylenically unsaturated monomer.

9. The coating as claimed in claim 6 which comprises an elastomeric white roof coating.

10. A method of making an aqueous coating compositions as claimed in claim 1, comprising redox initiation emulsion polymerizing in an aqueous medium the monomer mixture of monomers (a), (b), (c), and, if included, the vinyl aromatic monomer and/or the (meth)acrylonitrile in the presence of an excess of (ii) reductant to form (i) a copolymer; and, combining the copolymer (i) and excess (ii) reductant with (iii) a combination of one or more of a pigment, extender, filler and mixtures thereof with one or more hydrophilic polymeric dispersant in a total amount so that the composition has a pigment volume concentration (% PVC) of from 20 to 55, and (iv) one or more multivalent transition metal ion or multivalent transition metal ion compound or salt.

* * * * *